(12) United States Patent
Aoki

(10) Patent No.: US 12,710,628 B2
(45) Date of Patent: Aug. 18, 2026

(54) IMAGING OPTICAL SYSTEM AND IMAGE PICKUP APPARATUS HAVING THE SAME

(71) Applicant: CANON KABUSHIKI KAISHA, Tokyo (JP)

(72) Inventor: Koji Aoki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 203 days.

(21) Appl. No.: 18/824,966

(22) Filed: Sep. 5, 2024

(65) Prior Publication Data

US 2025/0085522 A1 Mar. 13, 2025

(30) Foreign Application Priority Data

Sep. 12, 2023 (JP) ................................. 2023-147317

(51) Int. Cl.
*G01B 9/02* (2022.01)
*G02B 17/08* (2006.01)

(52) U.S. Cl.
CPC ................................ *G02B 17/0804* (2013.01)

(58) Field of Classification Search
None
See application file for complete search history.

(56) References Cited

U.S. PATENT DOCUMENTS 9,921,409 B2 3/2018 Aoki
9,939,634 B2 4/2018 Aoki
10,288,855 B2 5/2019 Aoki
10,701,251 B2 6/2020 Aoki
11,204,234 B1 * 12/2021 Heideman .......... G01B 9/02041
2015/0185493 A1 7/2015 Aoki

FOREIGN PATENT DOCUMENTS

JP 2005352273 A 12/2005
WO 2024/176938 A1 8/2024

OTHER PUBLICATIONS

Combined Search and Examination Report issued by the GB Patent Office on Feb. 27, 2025 in corresponding GB Patent Application No. GB2413041.1, pp. 1-6.
Examination Report issued by the GB Patent Office on Feb. 2, 2026 in corresponding GB Patent Application No. GB2413041.1, pp. 1-3.

* cited by examiner

*Primary Examiner* — Carl Adams
(74) *Attorney, Agent, or Firm* — Carter, DeLuca & Farrell LLP

(57) ABSTRACT

An imaging optical system includes, in order from an object side to an image side, at least one concave lens, an aperture stop, a first transmissive reflective surface, a quarter waveplate, and a second transmissive reflective surface, arranged such that light from the object side transmits through the first transmissive reflective surface and the quarter waveplate in this order, is reflected by the second transmissive reflective surface toward the object side, transmits through the quarter waveplate, is reflected by the first transmissive reflective surface toward the image side, transmits through the quarter waveplate and the second transmissive reflective surface in this order, and travels toward the image side. A predetermined inequality is satisfied.

20 Claims, 7 Drawing Sheets

IMAGING OPTICAL SYSTEM AND IMAGE PICKUP APPARATUS HAVING THE SAME

BACKGROUND

Technical Field

One of the aspects of the embodiments relates to an imaging optical system suitable for a wide-angle configuration.

Description of Related Art

Imaging optical systems have recently been increasingly demanded to have reduced sizes due to the widespread of smartphone cameras and the switch from single-lens reflex cameras to mirrorless cameras in the high-end camera market. In addition to the reduced sizes of cameras, the imaging optical systems have been increasingly demanded to have wider-angle configurations for capturing wider fields in the market for drones and vehicle mounted cameras. Japanese Patent Laid-Open No. 2005-352273 discloses a compact imaging optical system using two transmissive reflective surfaces.

However, the imaging optical system disclosed in Japanese Patent Laid-Open No. 2005-352273 is not sufficient in terms of the wide-angle configuration or excellent optical performance.

SUMMARY

An imaging optical system according to one aspect of the disclosure includes, in order from an object side to an image side, at least one concave lens, an aperture stop, a first transmissive reflective surface, a quarter waveplate, and a second transmissive reflective surface, arranged such that light from the object side transmits through the first transmissive reflective surface and the quarter waveplate in this order, is reflected by the second transmissive reflective surface toward the object side, transmits through the quarter waveplate, is reflected by the first transmissive reflective surface toward the image side, transmits through the quarter waveplate and the second transmissive reflective surface in this order, and travels toward the image side. The following inequality is satisfied:

$$0.55 \leq zm1/f \leq 4.80$$

where zm1 is a distance on an optical axis from the first transmissive reflective surface to an image plane, and f is a focal length of the imaging optical system. An image pickup apparatus having the above imaging optical system also constitutes another aspect of the disclosure.

An imaging optical system according to another aspect of the disclosure includes, in order from an object side to an image side, an aperture stop, a first transmissive reflective surface, a quarter waveplate, and a second transmissive reflective surface, arranged such that light from the object side transmits through the first transmissive reflective surface and the quarter waveplate in this order, is reflected by the second transmissive reflective surface toward the object side, transmits through the quarter waveplate, is reflected by the first transmissive reflective surface toward the image side, transmits through the quarter waveplate and the second transmissive reflective surface in this order, and travels toward the image side. The following inequality is satisfied:

$$0.80 \leq zm1/f \leq 4.80$$

where zm1 is a distance on an optical axis from the first transmissive reflective surface to the image plane, and f is a focal length of the imaging optical system. An image pickup apparatus having the above imaging optical system also constitutes another aspect of the disclosure.

Further features of various embodiments of the disclosure will become apparent from the following description of embodiments with reference to the attached drawings.

DESCRIPTION OF THE EMBODIMENTS

Figure 1:
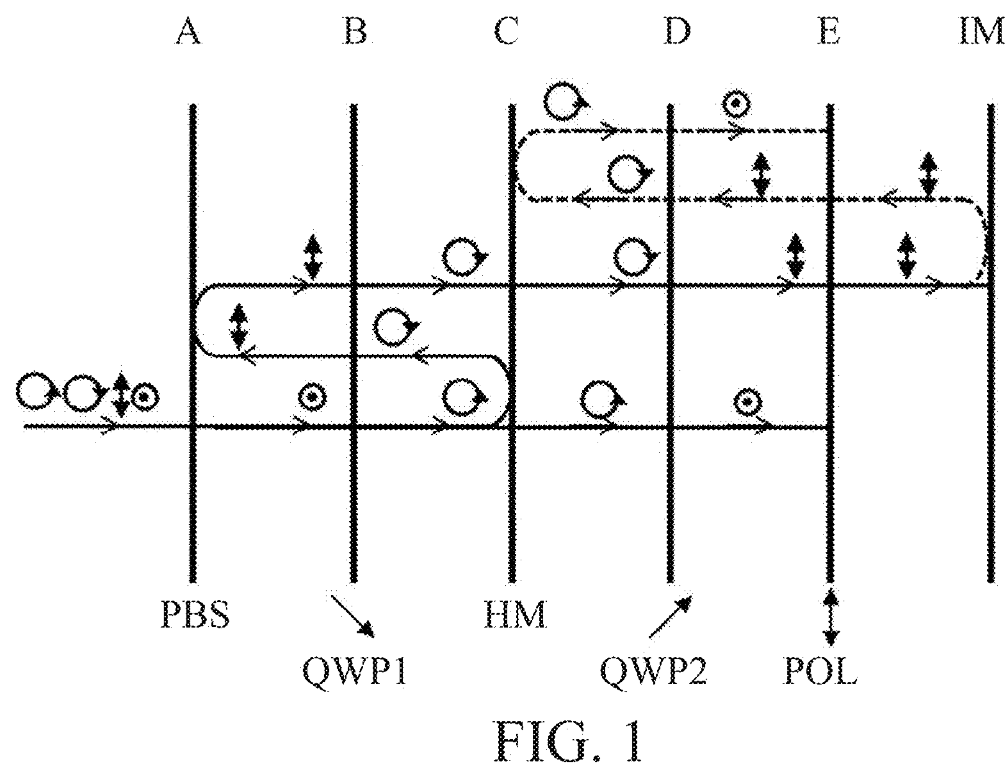
FIG. 1 is a schematic diagram illustrating an optical path of an optical system.

Referring now to the accompanying drawings, a detailed description will be given of embodiments according to the disclosure. Corresponding elements in respective figures will be designated by the same reference numerals, and a duplicate description thereof will be omitted.

The imaging optical system according to each example is an optical system configured to form an object image on an image plane and acquire an image using a solid-state image sensor or photosensitive film disposed on the image plane.

The imaging optical system according to each example includes, arranged in this order from the object side to the image side, a first transmissive reflective surface, a quarter waveplate (QWP), and a second transmissive reflective surface. Light from the object side transmits through the first transmissive reflective surface and the QWP in this order, and is reflected by the second transmissive reflective surface. The light then transmits through the QWP and is reflected by the first transmissive reflective surface, and then transmits through the QWP and the second transmissive reflective surface, and travels toward an imaging unit such as a solid-state image sensor or photosensitive film.

Each of the first transmissive reflective surface and the second transmissive reflective surface does not necessarily have a transmittance of 50% and a reflectance of 50%. A ratio of the transmittance to the reflectance for randomly polarized light may be in a range of 1:3 to 3:1. Randomly polarized light is light with Stokes parameters S0=1, S1=S2=S3=0. Each of the first and second transmissive reflective surfaces may absorb light.

A lens may be formed or cemented on both or one side of each transmissive reflective surface.

The QWP may use, for example, a polymer film or liquid crystal alignment layer having birefringence. A laminate of such polymer films or liquid crystal alignment layers may also be used as the QWP. Properly laminating them can provide a phase difference close to a quarter of the wavelength in a wide wavelength range. In addition to the above, an inorganic waveplate from Dexerials Corporation may also be used as the QWP.

The QWP may be cemented, for example, with the first transmissive reflective surface or the second transmissive reflective surface. The QWP may also be disposed separately from these transmissive reflective surfaces. For example, the film may be inserted directly into the optical path, or the film may be bonded to a glass plate and inserted into the optical path. A lens may be formed or cemented on both sides or one side of the QWP. For example, a lens may be molded on one side or both sides of the inorganic waveplate using wafer-level optics technology as a substrate.

The characteristic configuration of the imaging optical system according to each example will be described below.

The imaging optical system according to each example includes an aperture stop on the object side of the first transmissive reflective surface. This configuration can satisfactorily correct coma and curvature of field in particular.

The imaging optical system according to each example also further includes at least one concave lens on the object side of the aperture stop. This configuration can reduce a focal length of the imaging optical system and realize a wider angle of view.

The imaging optical system according to each example satisfies the following inequality (1-1):

$$0.55 \le zm1/f \le 4.80 \tag{1-1}$$

where zm1 is a distance on the optical axis from the first transmissive reflective surface to the image plane, and f is a focal length of the imaging optical system.

In a case where the distance zm1 reduces and the value of zm1/f becomes lower than the lower limit of inequality (1-1), it becomes difficult to secure the back focus of the imaging optical system. In a case where the focal length f increases and the value of zm1/f becomes lower than the lower limit of inequality (1-1), it becomes difficult to achieve the wide-angle configuration for the imaging optical system. In a case where the distance zm1 increases and the value of zm1/f becomes higher than the upper limit of inequality (1-1), the size of the lens apparatus increases and it becomes difficult to correct the curvature of field in particular.

The imaging optical system according to each example does not have to include at least one concave lens on the object side of the aperture stop. In this case, the optical system according to each example satisfies the following inequality (1-2).

$$0.80 \le zm1/f \le 4.80 \tag{1-2}$$

This configuration can realize a compact imaging optical system with a wide angle and a bright F-number.

Inequalities (1-1) and (1-2) may be replaced with inequality (1a) below:

$$0.80 \le zm1/f \le 4.50 \tag{1a}$$

Inequalities (1-1) and (1-2) may be replaced with inequality (1b) below:

$$0.85 \le zm1/f \le 4.20 \tag{1b}$$

A description will now be given of the configuration that may be satisfied in the imaging optical system according to each example.

The second transmissive reflective surface may have a concave shape on the object side. This configuration can satisfactorily correct curvature of field particularly.

A description will now be given of inequalities that may be satisfied in the imaging optical system according to each example. The imaging optical system according to each example may satisfy one or more of the following inequalities (2) to (9).

$$1.2 \le zp/f \le 6.5 \tag{2}$$

$$1.0 \le Dp/f \le 6.5 \tag{3}$$

$$0.005 \le Dm/L \le 0.060 \tag{4}$$

$$0.50 \le zm2/f \le 4.50 \tag{5}$$

$$0.07 \le Dm1/L \le 0.40 \tag{6}$$

$$0.09 \le Dm2/L \le 0.42 \tag{7}$$

$$2.5 \le L/f \le 11.5 \tag{8}$$

$$0.55 \le Fno \le 2.50 \tag{9}$$

Here, zp is a distance on the optical axis from the aperture stop to the image plane. Dp is a distance on the optical axis from a lens surface closest to the object in the imaging optical system to the aperture stop. L is an overall length of the imaging optical system (distance on the optical axis from a lens surface closest to the object to the image plane). Dm is a distance on the optical axis from the first transmissive reflective surface to the second transmissive reflective surface. zm2 is a distance on the optical axis from the second transmissive reflective surface to the image plane. Dm1 is a distance on the optical axis from the aperture stop to the first transmissive reflective surface. Dm2 is a distance on the optical axis from the aperture stop to the second transmissive reflective surface. Fno is an F-number of the imaging optical system.

In a case where the distance zp reduces and the value of zp/f becomes lower than the lower limit of inequality (2), it becomes difficult to correct the curvature of field. In a case where the focal length f increases and the value of zp/f becomes lower than the lower limit of inequality (2), it becomes difficult to achieve the wide-angle configuration for the imaging optical system. In a case where the distance zp increases and the value of zp/f becomes higher than the upper limit of inequality (2), the size of the lens apparatus increases.

In a case where the distance Dp reduces and the value of Dp/f becomes lower than the lower limit of inequality (3), it becomes difficult to correct distortion in particular. In a case where the focal length f increases and the value of Dp/f becomes lower than the lower limit of inequality (3), it becomes difficult to achieve the wide-angle configuration for the imaging optical system. In a case where the distance Dp increases and the value of Dp/f becomes higher than the upper limit of inequality (3), the size of the lens apparatus increases.

In a case where the distance Dm reduces and the value of Dm/L becomes lower than the lower limit of inequality (4), interference may occur between the transmissive reflective surfaces. In a case where the distance Dm increases and the value of Dm/L becomes higher than the upper limit of inequality (4), it becomes difficult to correct coma in particular.

In a case where the distance zm2 reduces and the value of zm2/f becomes lower than the lower limit of inequality (5), it becomes difficult to secure the back focus for the imaging optical system. In a case where the focal length f increases and the value of zm2/f becomes lower than the lower limit of inequality (5), it becomes difficult to achieve the wide-angle configuration for the imaging optical system. In a case where the distance zm2 increases and the value of zm2/f becomes higher than the upper limit of inequality (5), the size of the lens apparatus increases and it becomes difficult to correct the curvature of field in particular.

In a case where the distance Dm1 reduces and the value of Dm1/L becomes lower than the lower limit of inequality (6), it becomes difficult to correct the curvature of field in particular. In a case where the distance Dm1 increases and the value of Dm1/L becomes higher than the upper limit of inequality (6), the size of the lens apparatus increases.

In a case where the distance Dm2 reduces and the value of Dm2/L becomes lower than the lower limit of inequality (7), it becomes difficult to correct the curvature of field in particular. In a case where the distance Dm2 increases and the value of Dm2/L becomes higher than the upper limit of inequality (7), the size of the lens apparatus increases.

In a case where the focal length f increases and the value of L/f becomes lower than the lower limit of inequality (8), it becomes difficult to achieve the wide-angle configuration for the imaging optical system. In a case where the distance L increases and the value of L/f becomes higher than the upper limit of inequality (8), the size of the lens apparatus increases.

In a case where the F-number Fno becomes lower than the lower limit of inequality (9), it becomes particularly difficult to correct spherical aberration and coma. In a case where the F-number Fno becomes higher than the upper limit of inequality (9), the imaging optical system lacks brightness.

Inequalities (2) to (9) may be replaced with inequalities (2a) to (9a) below:

$$1.4 \le zp/f \le 6.0 \tag{2a}$$

$$1.2 \le Dp/f \le 6.0 \tag{3a}$$

$$0.008 \le Dm/L \le 0.055 \tag{4a}$$

$$0.60 \le zm2/f \le 4.30 \tag{5a}$$

$$0.08 \le Dm1/L \le 0.35 \tag{6a}$$

$$0.10 \le Dm2/L \le 0.37 \tag{7a}$$

$$2.8 \le L/f \le 10.5 \tag{8a}$$

$$0.60 \le Fno \le 2.30 \tag{9a}$$

Inequalities (2) to (9) may be replaced with inequalities (2b) to (9b) below:

$$1.6 \le zp/f \le 5.5 \tag{2b}$$

$$1.4 \le Dp/f \le 5.5 \tag{3b}$$

$$0.011 \le Dm/L \le 0.050 \tag{4b}$$

$$0.70 \le zm2/f \le 4.10 \tag{5b}$$

$$0.09 \le Dm1/L \le 0.25 \tag{6b}$$

$$0.11 \le Dm2/L \le 0.29 \tag{7b}$$

$$3.1 \le L/f \le 10.0 \tag{8b}$$

$$0.65 \le Fno \le 2.10 \tag{9b}$$

Configuration 1 Utilizing Polarization

Referring now to FIG. 1, a description will be given of a configuration utilizing polarization. The imaging optical system having this configuration includes two transmissive reflective surfaces. Here, the transmissive reflective surface disposed on the object side of the imaging optical system having this configuration includes a polarization-selective transmissive reflective element (polarizing beam splitter: PBS): A. The transmissive reflective surface disposed on the image plane side of the imaging optical system having this configuration includes a half-mirror (HM): C. A first quarter waveplate (QWP1): B is disposed between the polarization-selective transmissive reflective element PBS and the half-mirror HM. A second quarter waveplate (QWP2): D and a linear polarizer (POL): E are disposed between the half-mirror HM and the imaging surface IM in this order from the object side to the image side.

Here, the polarization-selective transmissive reflective element A is an element configured to reflect linearly polarized light polarized in the same direction as a direction when it has transmitted through the linear polarizer E, and to transmit linearly polarized light perpendicular to this direction. The polarization-selective transmissive reflective element A is, for example, a wire grid polarizer or a reflection type polarizer having a laminated retardation film configuration. In this case, the wire grid forming surface or retardation film surface of the polarization-selective transmissive reflective element A functions as the transmissive reflective surface. The wire grid polarizer does not necessarily have to be made of aligned metal wires, but may be anything including thin metal or dielectric layers arranged at predetermined intervals as long as it can function as a polarization-selective transmissive reflective element. For example, an element having metal or dielectric layers aligned by vapor deposition may be used.

The first quarter waveplate B and the second quarter waveplate D are arranged with their slow axes tilted at 45° relative to the polarization transmission axis of the linear polarizer E. Here, the first quarter waveplate B and the second quarter waveplate D may be arranged with their slow axes tilted at 90°. Due to this arrangement, in a case where light transmits through the first quarter waveplate B and the second quarter waveplate D, the wavelength dispersion characteristics of the waveplates are cancelled out.

The half-mirror C is a half-mirror formed, for example, by a dielectric multilayer film or metal deposition, and the mirror surface of the half-mirror C functions as a transmissive reflective surface. The linear polarizer E is, for example, an absorption-type linear polarizer.

A description will now be given of the optical path selection and function in the configuration utilizing the polarization.

Light incident on the imaging optical system from the object side becomes linearly polarized light by the polarization-selective transmissive reflective element A, becomes circularly polarized light by the first quarter waveplate B, and enters the half-mirror C. A part of the light that reaches the half-mirror C is reflected, becomes circularly polarized in the reverse direction, and returns to the first quarter waveplate B.

The reverse-circularly polarized light that has returned to the first quarter waveplate B returns to the polarization-selective transmissive reflective element A by the first quarter waveplate B as linearly polarized light polarized in a direction perpendicular to the direction when the light first transmitted through the polarization-selective transmissive reflective element A. The light that has returned to the polarization-selective transmissive reflective element A is reflected by the polarization-selective transmissive reflective element A. Here, due to the polarization selectivity of the polarization-selective transmissive reflective element A, linearly polarized light polarized in the direction perpendicular to the direction when the light first transmitted through the polarization-selective transmissive reflective element A is reflected.

A part of the light that has reached the half-mirror C transmits through it, becomes linearly polarized light by the second quarter waveplate D polarized in the same direction as that when the light transmitted through the polarization-selective transmissive reflective element A, enters the linear polarizer E, and is absorbed by the linear polarizer E.

The light reflected by the polarization-selective transmissive reflective element A becomes circularly polarized by the first quarter waveplate B and enters the half-mirror C. A part of the light that has reached the half-mirror C transmits through it, and enters the second quarter waveplate D. Due to the second quarter waveplate D, the incident light becomes linearly polarized light polarized in a direction parallel to that of the linearly polarized light reflected by the polarization-selective transmissive reflective element A. The light that transmits through the second quarter waveplate D enters the linear polarizer E. Here, the polarization of the light and the transmission axis of the linear polarizer E match, so most of the light transmits and is guided to the imaging surface IM.

Due to the above action, only the light that transmits through the polarization-selective transmissive reflective element PBS, is reflected by the half-mirror C, is reflected by the polarization-selective transmissive reflective element PBS, and transmits through the half-mirror C is guided to the imaging surface IM.

In a case where a cholesteric liquid crystal is used instead of the half-mirror C, the cholesteric liquid crystal may be installed so that the cholesteric liquid crystal reflects a large amount of the circularly polarized light in the direction of the incident light during the first reflection. Thus, a light amount can be increased on the normal optical path while ghost light is reduced.

Solid-state image sensors and Charge Coupled Devices (CCDs) that can be used for the imaging surface IM generally have high surface reflectance. In this configuration, the light reflected by the imaging surface IM transmits through the linear polarizer E again and is converted into circularly polarized light by the second quarter waveplate D. The light emitted from the second quarter waveplate D is then reflected by the half-mirror C, becomes circularly polarized light in the opposite direction, and transmits through the second quarter waveplate D again. At this time, the circularly polarized light is converted by the second quarter waveplate D into linearly polarized light polarized in a direction perpendicular to that of the light that has just transmitted through the linear polarizer E. Since the direction of this linearly polarized light is orthogonal to the transmission axis of the linear polarizer E, most of the light is absorbed by the linear polarizer E. Thus, in this configuration, most of the light that is reflected by the imaging surface IM and the half-mirror C in this order is cut off, ghosts and flares relating to the imaging surface IM are less conspicuous. In order to obtain such a reflection reducing effect, no optical low-pass filter using birefringence may be located between the imaging surface IM and the linear polarizer E. This is because the optical low-pass filter causes the polarization state to shift from the desired polarization state.

In this configuration, a quarter waveplate may be placed between the polarization-selective transmissive reflective element A and the object. In this case, the quarter waveplate and the polarization-selective transmissive reflective element A are arranged so that the fast axis or slow axis of the quarter waveplate forms an angle of 45° with the transmission axis of the polarization-selective transmissive reflective element A.

Thus, even if the light incident from the object side is linearly polarized, imaging is available regardless of its polarization direction. A depolarizing element may be placed instead of the quarter waveplate. For example, "Cosmoshine SRF" by Toyobo Co., Ltd. can be used as the depolarizing element.

Configuration 2 Utilizing Polarization

Figure 2:
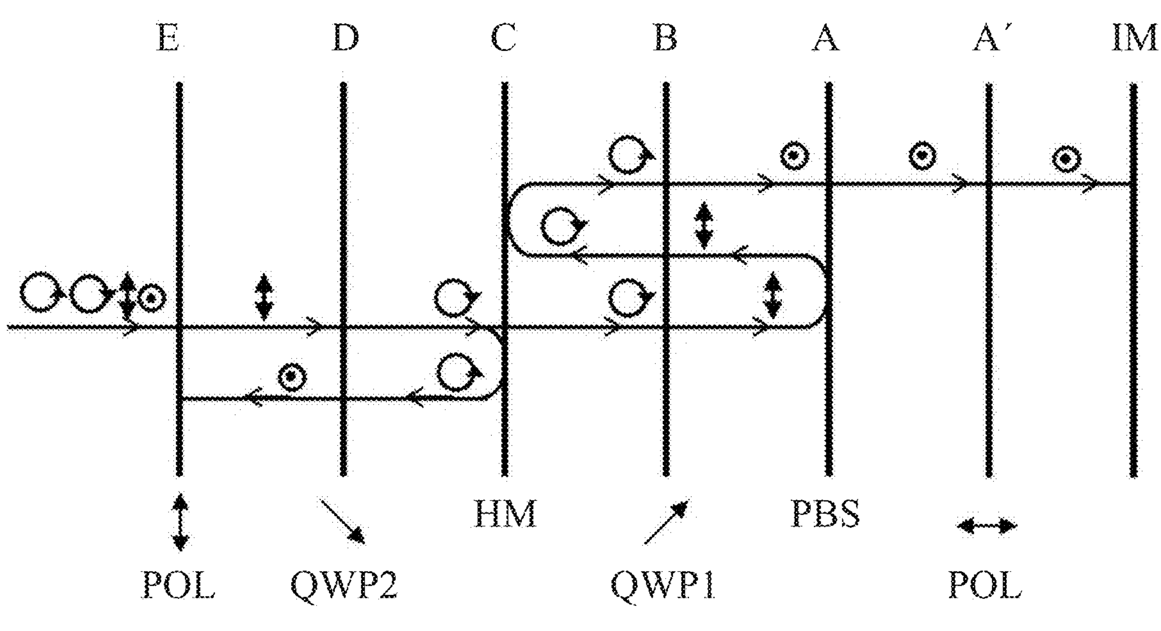
FIG. 2 is a schematic diagram illustrating an optical path of an optical system.

Referring now to FIG. 2, a description will be given of a configuration utilizing polarization. The imaging optical system having this configuration includes two transmissive reflective surfaces. Here, the transmissive reflective surface placed on the object side of the imaging optical system having this configuration includes a half-mirror (HM): C. The transmissive reflective surface disposed on the image side of the imaging optical system having this configuration includes a polarization-selective transmissive reflective element (PBS): A. A first quarter waveplate (QWP1): B is disposed between the polarization-selective transmissive reflective element PBS and the half-mirror HM. A linear polarizer (POL): E and a second quarter waveplate (QWP2): D are arranged between the half-mirror HM and the object plane in that order from the object side to the image side.

The configuration of each polarizing element and the suitable arrangement of the optical axis orientation are similar to those of the configuration 1 utilizing the polarization.

A description will now be given of the optical path selection and action in the configuration utilizing the polarization.

Light incident on the imaging optical system from the object side becomes linearly polarized light by the linear polarizer E, becomes circularly polarized light by the second quarter waveplate D, and enters the half-mirror C. A part of the light that has reached the half-mirror C is reflected, becomes circularly polarized light in the opposite direction, and returns to the second quarter waveplate D.

The light that reaches and is reflected by the half-mirror C becomes circularly polarized light in the opposite direction to the incident direction. This light is converted by the second quarter waveplate D into linearly polarized light polarized in a direction perpendicular to the direction when it transmitted through the linear polarizer E, enters the linear polarizer E, and is absorbed by the linear polarizer E.

The light that has transmitted through the half-mirror C is converted by the first quarter waveplate B into linearly polarized light polarized in the same direction as that of the light that has just transmitted through the linear polarizer E. This linearly polarized light is reflected by the polarization-selective transmissive reflective element A and returns to the first quarter waveplate B. The light is then converted into circularly polarized light by the first quarter waveplate B, and a part of it is reflected by the half-mirror C. The light reflected by the half-mirror C again enters the first quarter waveplate B and is converted into linearly polarized light whose polarization direction is perpendicular to the direction when it was reflected by the polarization-selective transmissive reflective element A. This linearly polarized light transmits through the polarization-selective transmissive reflective element A and is guided to the imaging surface IM.

Due to the above action, only the light that transmits through the half-mirror C, is reflected by the polarization-selective transmissive reflective element PBS, is reflected by the half-mirror C, and transmits through the polarization-selective transmissive reflective element PBS is guided to the imaging surface IM.

Due to this arrangement, a linear polarizer A' may be placed between the polarization-selective transmissive reflective element A and the imaging surface IM. In this case, the transmission axes of the linear polarizer A' and the polarization-selective transmissive reflective element A are made to match. In this way, the light that is reflected by the imaging surface IM, is reflected by the polarization-selective transmissive reflective element A, enters the imaging surface IM again, and becomes ghosts and flares can be absorbed.

In this configuration, a quarter waveplate may be placed between the linear polarizer E and the object. In this case, the quarter waveplate and the linear polarizer E are arranged so that the fast axis or slow axis of the quarter waveplate forms an angle of 45° with the transmission axis of the linear polarizer E. In this way, even if the light incident from the object side is linearly polarized light, imaging is available regardless of its polarization direction. A depolarizing element may be placed instead of the quarter waveplate. As an example of a depolarizing element, "Cosmoshine SRF" manufactured by Toyobo Co., Ltd. can be used.

In the above description of the configuration, terms such as orthogonal (perpendicular), parallel, and 45° do not have to be strictly 90°, 0°, and 45°. However, these angles are to be within ±5° from the desired angles, and may be within ±2° from the desired angles, and may be within ±1° from the desired angles.

In the imaging optical system according to each example, a polymer material or a glass material may be used as the material for the lens. However, the lens placed between the first transmissive reflective surface and the second transmissive reflective surface may have low birefringence.

The configuration of the imaging optical system according to each example will be described below.

Example 1

Figure 3:
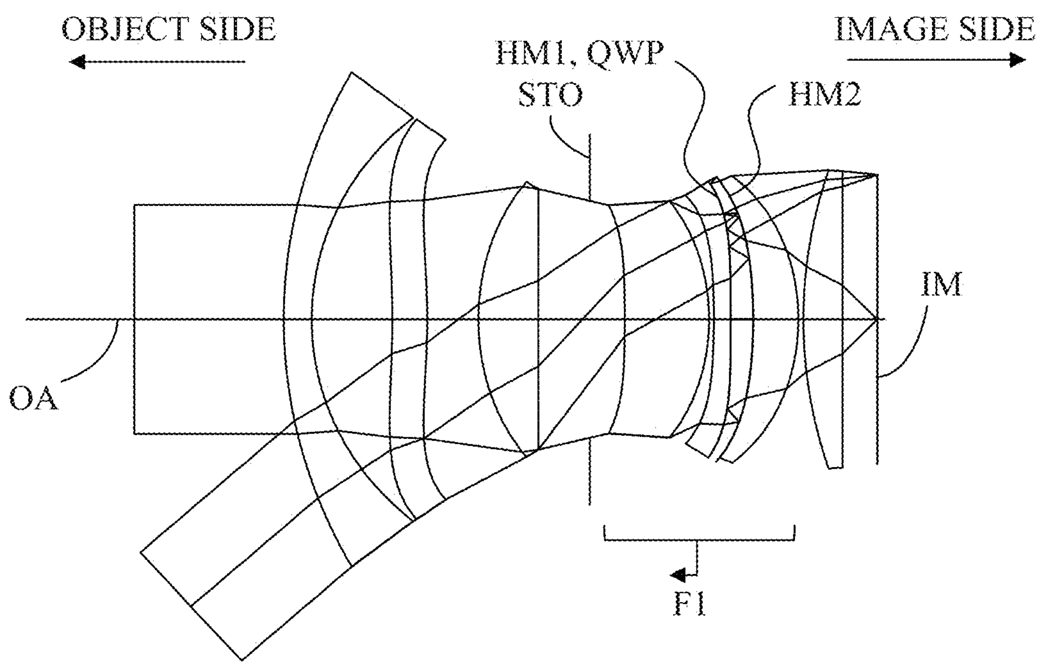
FIG. 3 is a sectional view of an imaging optical system according to Example 1.

FIG. 3 is a sectional view of the imaging optical system according to this example. The imaging optical system according to this example includes, in order from the object side to the image side, at least one concave lens, an F-number determining member (aperture stop) STO, a first transmissive reflective surface HM1, a quarter waveplate QWP, and a second transmissive reflective surface HM2. The imaging optical system according to this example is an optical system with an aperture ratio of about 0.7 and a half angle of view of about 42 degrees.

The first focus lens unit F1 is movable along an optical axis OA during focusing. The F-number determining member STO determines (limits) a light beam of the minimum F-number (Fno). IM is an image plane, on which the imaging surface of an image sensor (photoelectric conversion element) such as a CCD sensor or CMOS sensor is disposed.

Figure 4:
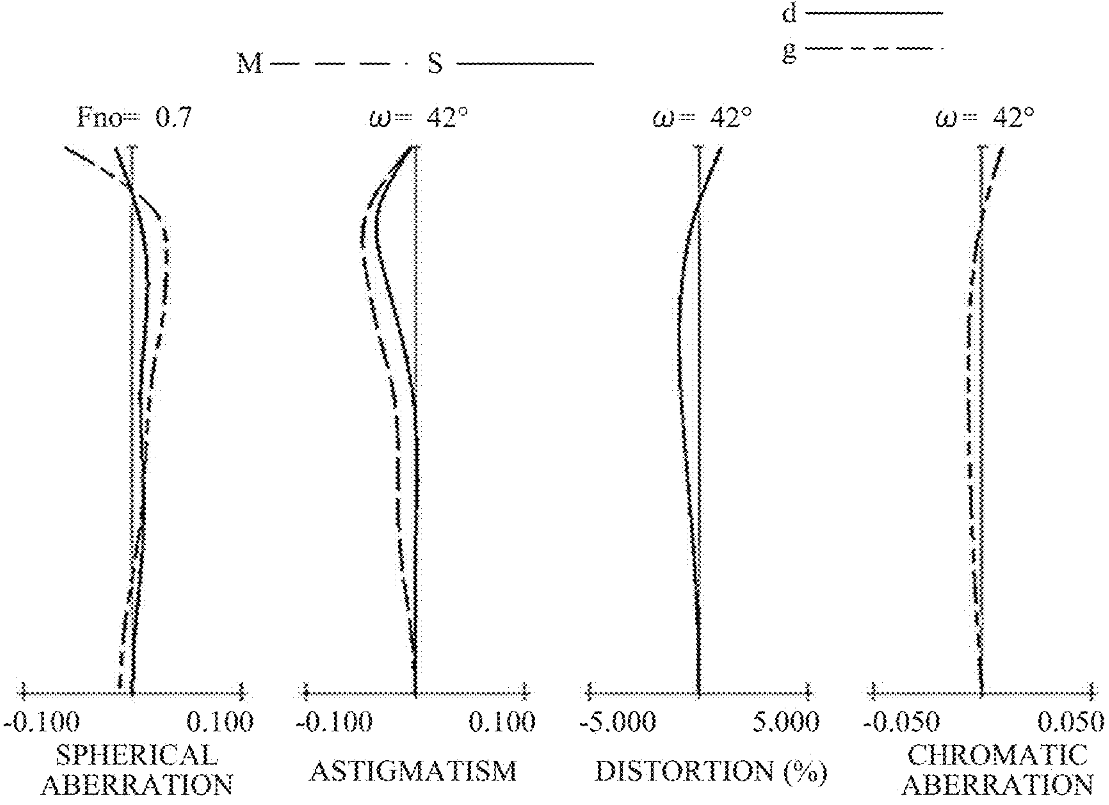
FIG. 4 is a longitudinal aberration diagram of the imaging optical system according to Example 1 in an in-focus state (on an object) at infinity.
Figure 5:
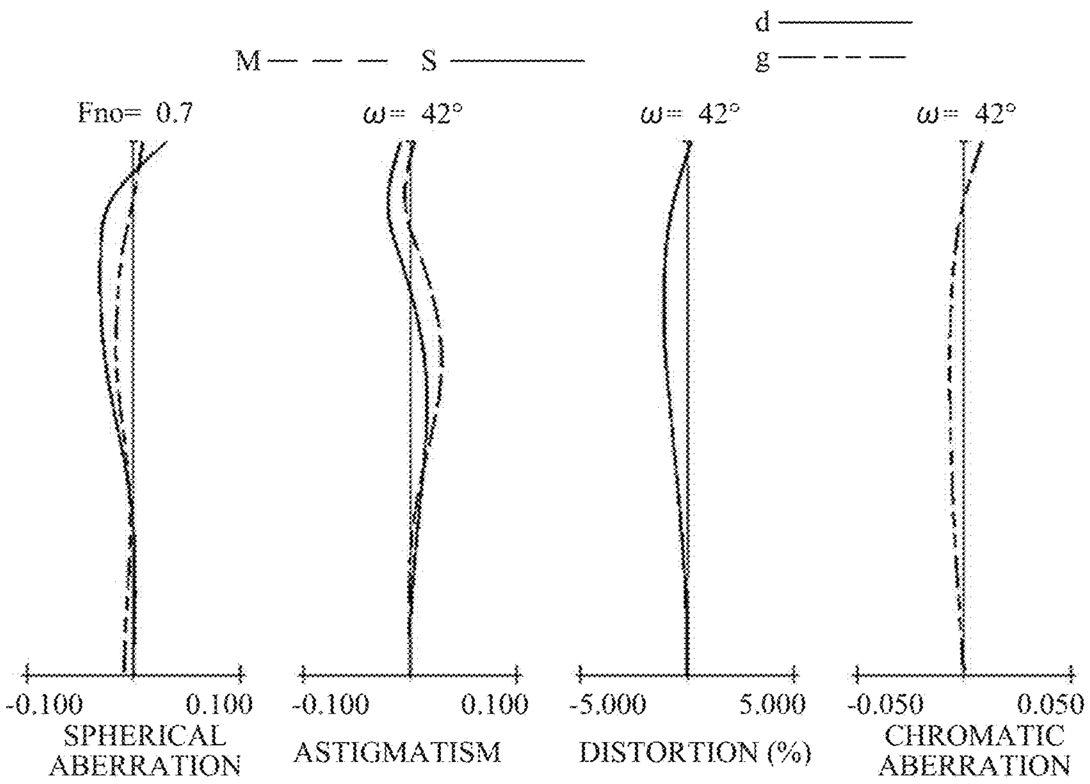
FIG. 5 is a longitudinal aberration diagram of the imaging optical system according to Example 1 in an in-focus state (on an object) at a close distance.

FIG. 4 is a longitudinal aberration diagram of the imaging optical system according to this example in an in-focus state (on an object) at infinity. FIG. 5 is a longitudinal aberration diagram of the imaging optical system according to this example in an in-focus state (on an object) at a close distance. In a spherical aberration diagram, Fno represents an F-number. The spherical aberration diagram illustrates spherical aberration amounts for the d-line (wavelength 587.6 nm) and g-line (wavelength 435.8 nm). In an astigmatism diagram, S indicates an astigmatism amount on a sagittal image plane, and M indicates an astigmatism amount on a meridional image plane. A distortion diagram illustrates a distortion amount for the d-line. A chromatic aberration diagram illustrates a chromatic aberration amount for the g-line. ω is a half angle of view (°).

Example 2

Figure 6:
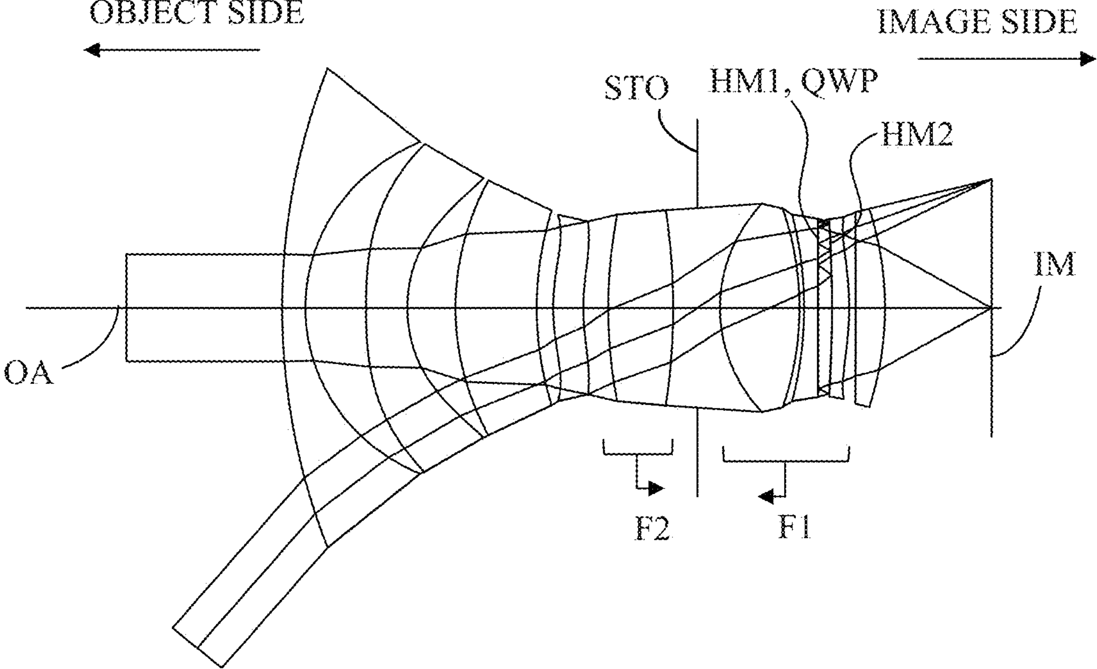
FIG. 6 is a sectional view of an imaging optical system according to Example 2.

FIG. 6 is a sectional view of an imaging optical system according to this example. The basic configuration of the imaging optical system according to this example is similar to that of the imaging optical system according to Example 1, and a detailed description thereof will be omitted. The imaging optical system according to this example is an optical system with an aperture ratio of about 1.0 and a half angle of view of about 50.2 degrees.

A first focus lens unit F1 and a second focus lens unit F2 are independently movable along the optical axis OA during focusing.

Figure 7:
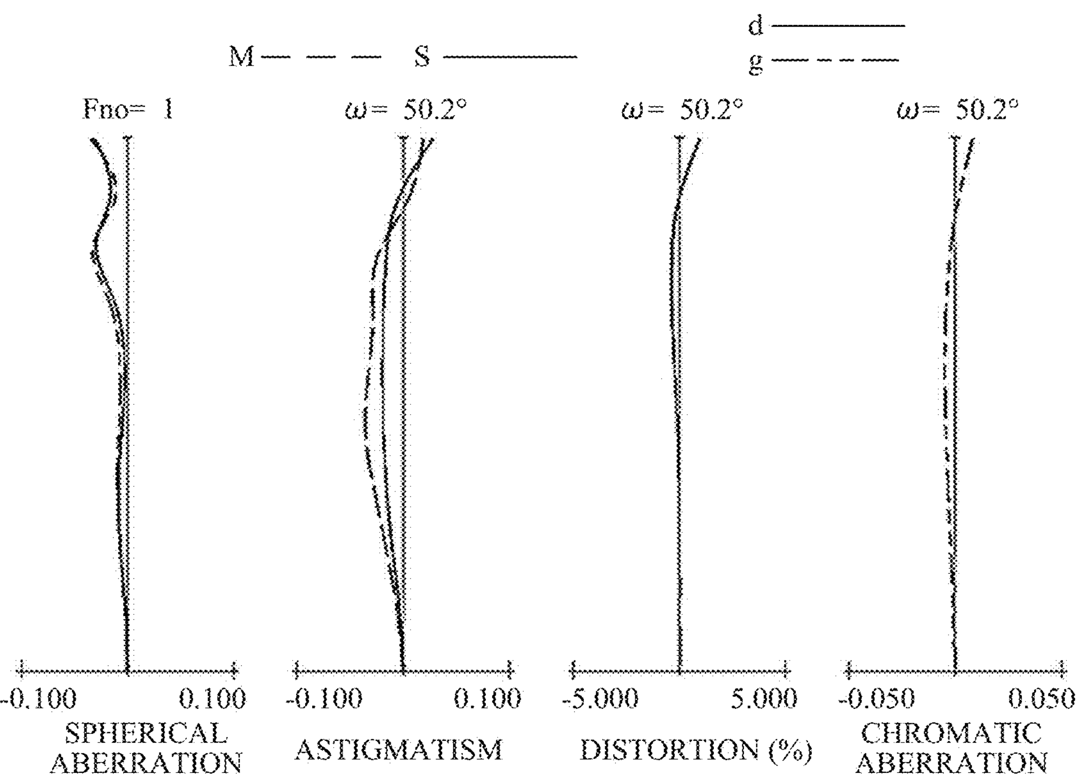
FIG. 7 is a longitudinal aberration diagram of the imaging optical system according to Example 2 in an in-focus state at infinity.
Figure 8:
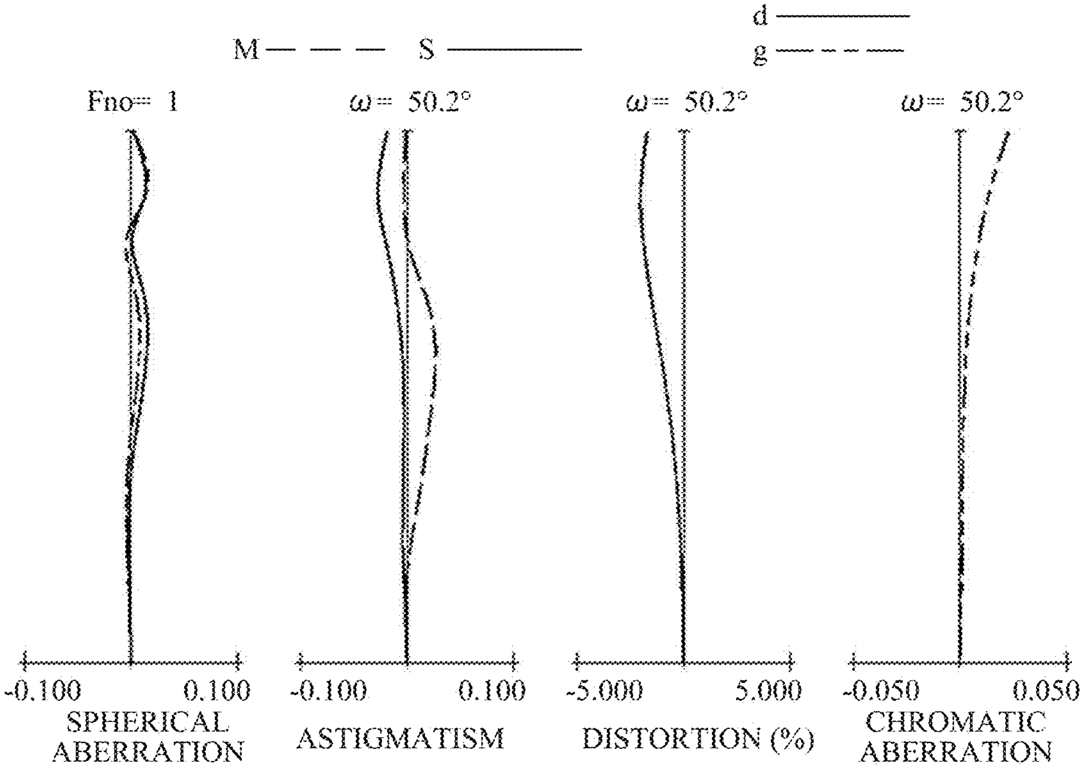
FIG. 8 is a longitudinal aberration diagram of the imaging optical system according to Example 2 in an in-focus state at a close distance.

FIG. 7 is a longitudinal aberration diagram of the imaging optical system according to this example in an in-focus state at infinity. FIG. 8 is a longitudinal aberration diagram of the imaging optical system according to this example in an in-focus state at a close distance.

Example 3

Figure 9:
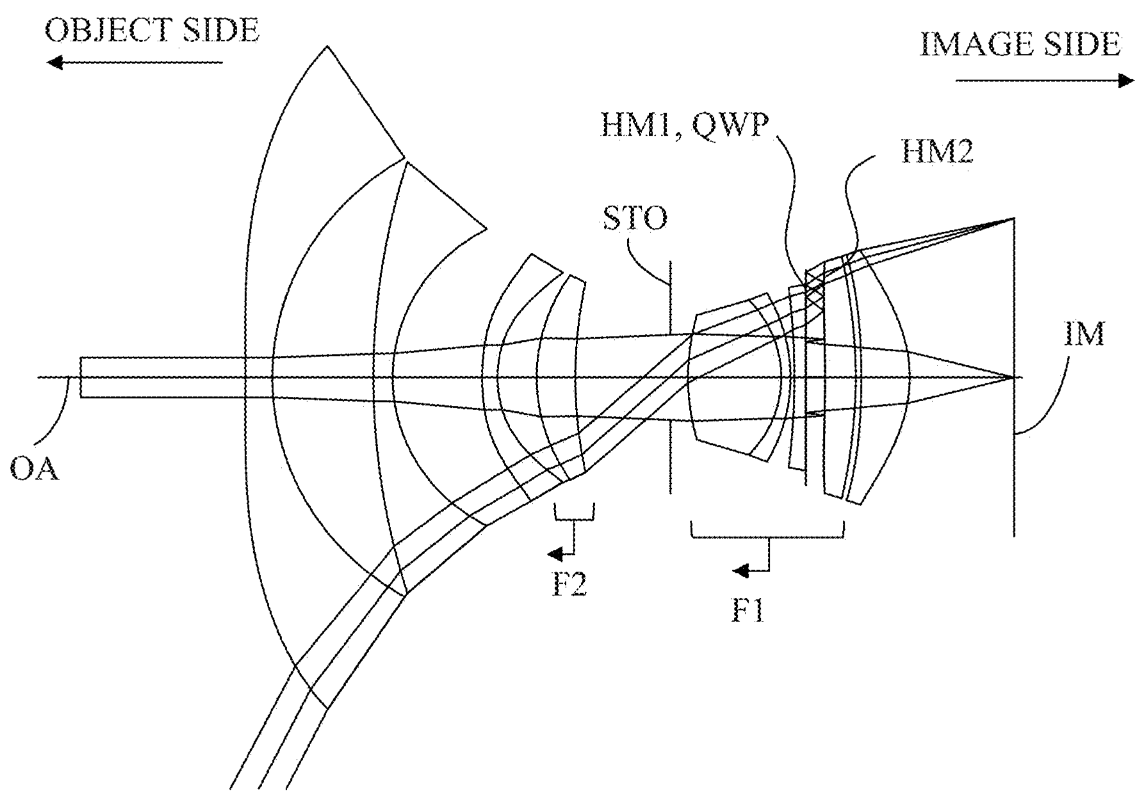
FIG. 9 is a sectional view of an imaging optical system according to Example 3.

FIG. 9 is a sectional view of an imaging optical system according to this example. The basic configuration of the imaging optical system according to this example is similar to that according to Example 1, and a description thereof will be omitted. The imaging optical system according to this example has an aperture ratio of 2.03 and a half angle of view of about 63 degrees.

The first focus lens unit F1 and the second focus lens unit F2 are independently movable along the optical axis OA during focusing.

Figure 10:
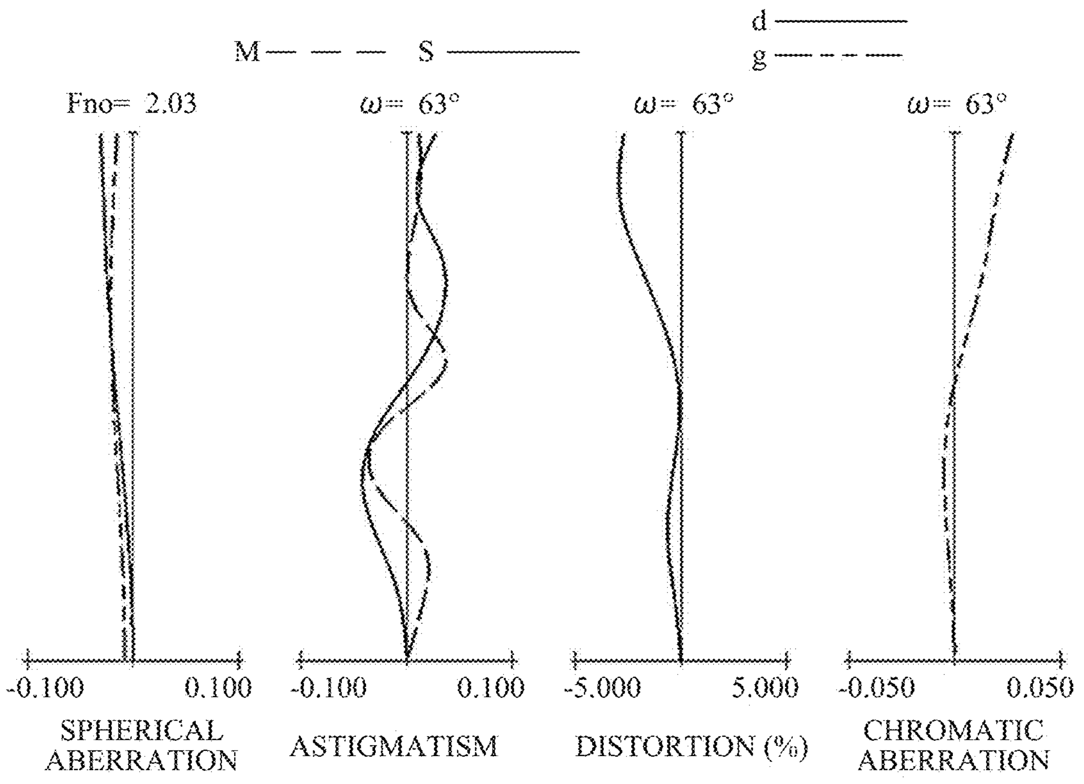
FIG. 10 is a longitudinal aberration diagram of the imaging optical system according to Example 3 in an in-focus state at infinity.
Figure 11:
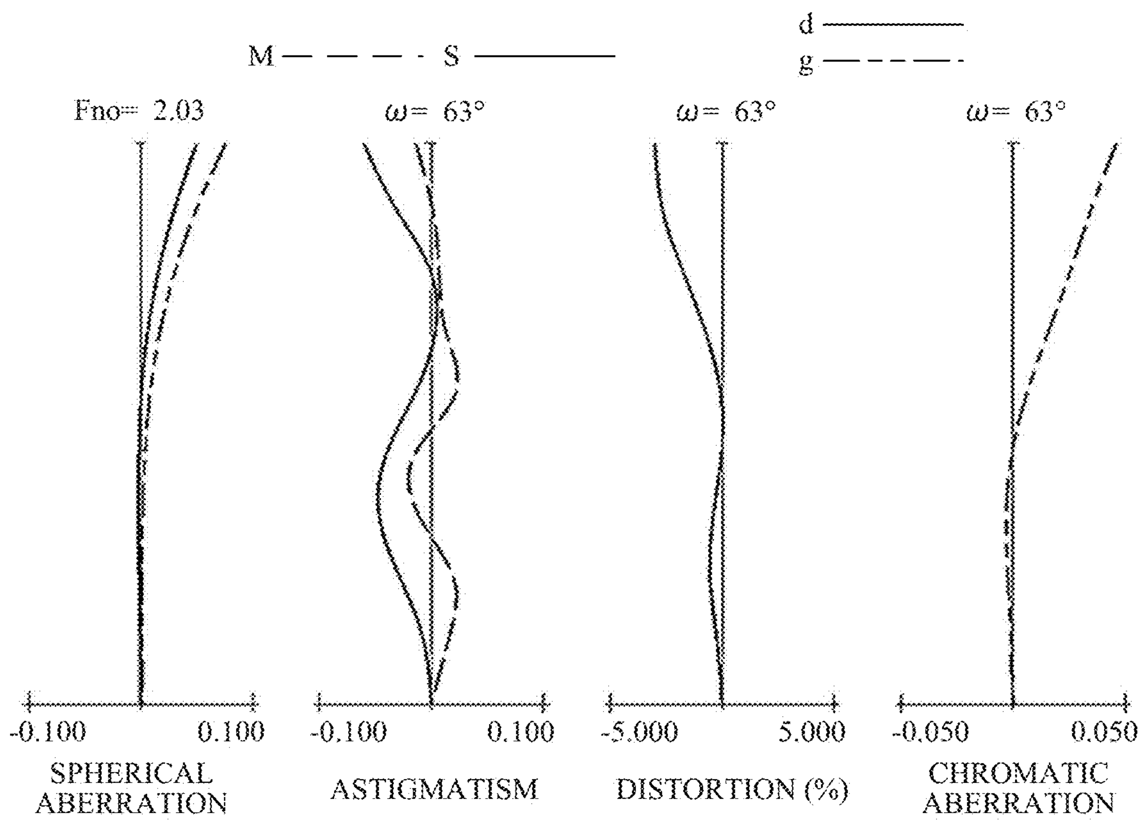
FIG. 11 is a longitudinal aberration diagram of the imaging optical system according to Example 3 in an in-focus state at a close distance.

FIG. 10 is a longitudinal aberration diagram of the imaging optical system according to this example in an in-focus state at infinity. FIG. 11 is a longitudinal aberration diagram of the imaging optical system according to this example in an in-focus state at a close distance.

Example 4

Figure 12:
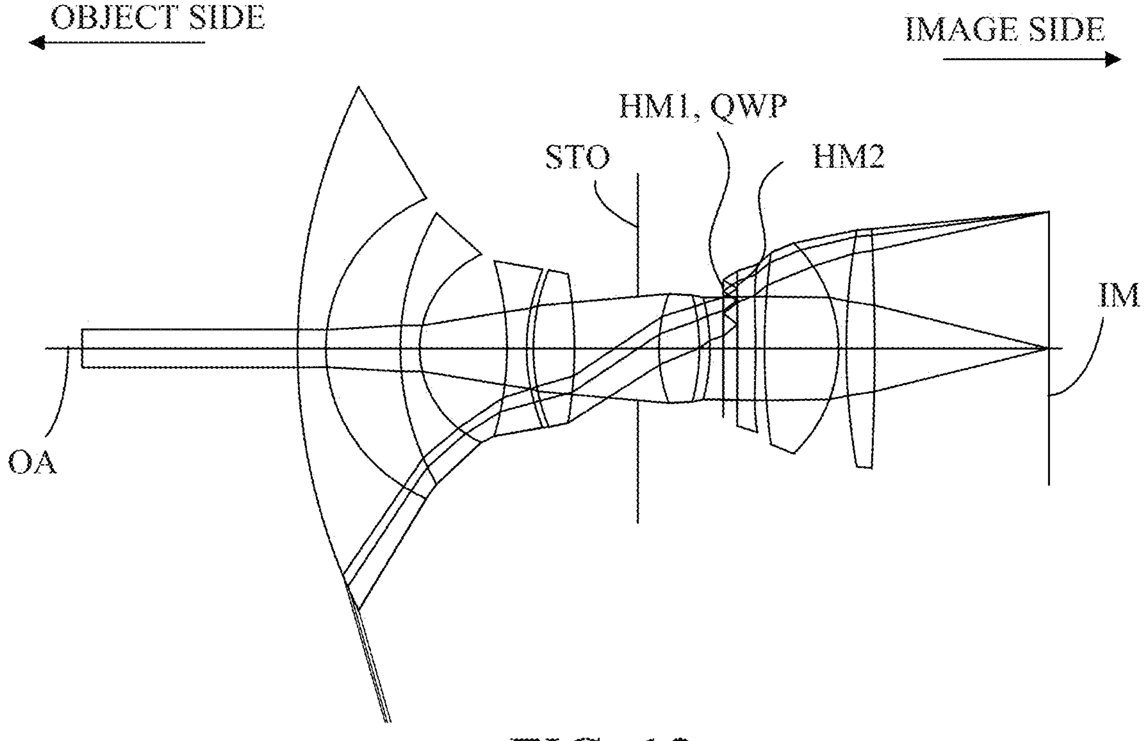
FIG. 12 is a sectional view of an imaging optical system according to Example 4.

FIG. 12 is a sectional view of the imaging optical system according to this example. The basic configuration of the imaging optical system according to this example is similar to that of the imaging optical system according to Example 1, and a description thereof will be omitted. The imaging optical system according to this example is an optical system with an aperture ratio of about 2.0 and a half angle of view of about 105 degrees.

Figure 13:
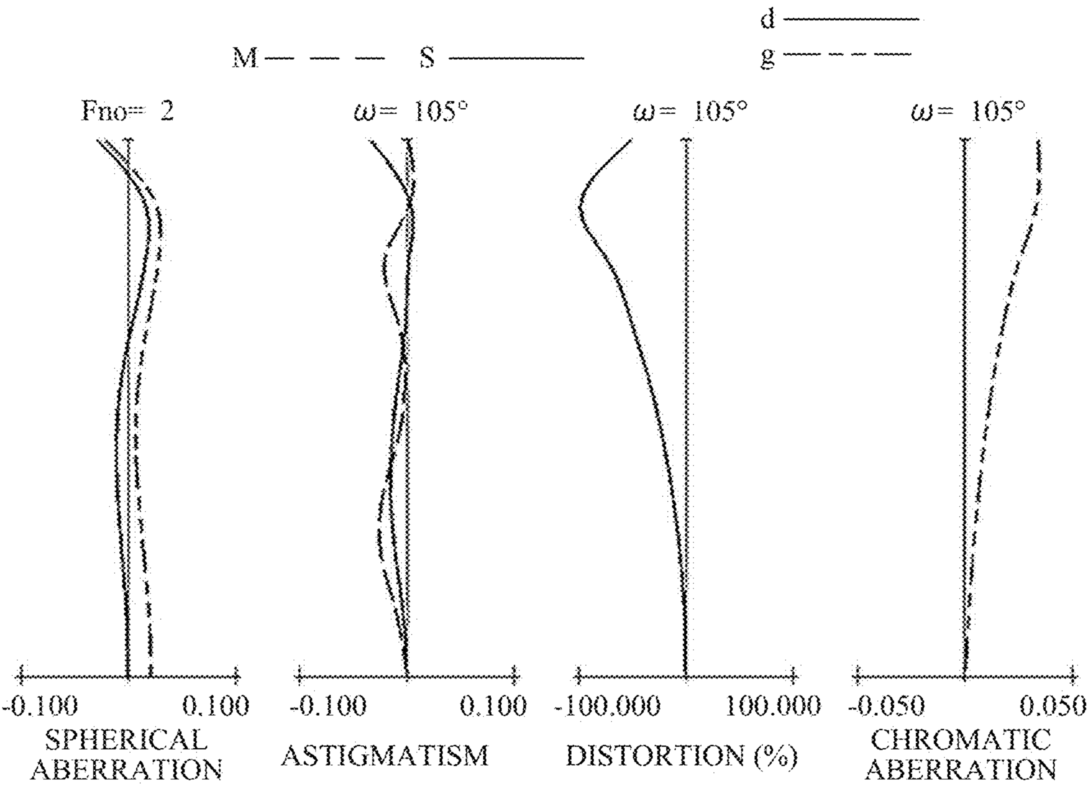
FIG. 13 is a longitudinal aberration diagram of the imaging optical system according to Example 4 in an in-focus state at infinity.

FIG. 13 is a longitudinal aberration diagram of the imaging optical system according to this example in an in-focus state at infinity.

A description will now be given of numerical values corresponding to Examples 1 to 4, respectively.

In surface data of each numerical example, r represents a radius of curvature of each optical surface, and d (mm) represents an on-axis distance (distance on the optical axis) between m-th and (m+1)-th surfaces, where m is a surface number counted from the light incident side. nd represents a refractive index of each optical element for the d-line, and vd represents the Abbe number of the optical member. The Abbe number vd of a certain material is expressed as follows:

$$vd=(Nd-1)/(NF-NC)$$

where Nd, NF, and NC are refractive indices for the d-line (587.6 nm), F-line (486.1 nm), and C-line (656.3 nm) in the Fraunhofer lines, respectively. STO represents an aperture stop.

In each numerical example, all of d, focal length (mm), F-number (Fno), and half angle of view (°) are values in a case where the optical system according to each example is in an in-focus state on an object at infinity. A "back focus (BF)" is a distance on the optical axis from a final lens surface (a lens surface closest to the image plane) to a paraxial image plane expressed in air-equivalent length. An "overall lens length" is a distance on the optical axis from the foremost lens surface (the lens surface closest to the object) of the optical system to the final surface plus the back focus. A "lens unit" includes one or more lenses.

In a case where an optical surface is aspheric, an asterisk * is added to the right side of the surface number. The aspheric shape is expressed as follows:

$$X=(h^2/R)/\left[1+\{1-(1+K)(h/R)^2\}^{1/2}\right]+A4\times h^4+A6\times h^6+A8\times h^8+A10\times h^{10}+A12\times h^{12}+A14\times h^{14}+A16\times h^{16}$$

where X is a displacement amount from a surface vertex in the optical axis direction, h is a height from the optical axis in a direction orthogonal to the optical axis, R is a paraxial radius of curvature, K is a conic constant, and A4, A6, A8, A10, A12, A14, and A16 are aspheric coefficients of each order. "e±XX" in each aspheric coefficient means "$\times 10^{\pm XX}$."

Numerical Example 1

UNIT: mm

SURFACE DATA

| Surface No. | r | d | nd | vd |
|---|---|---|---|---|
| 1 | 75.153 | 4.00 | 1.48749 | 70.2 |
| 2 | 38.626 | 11.54 | | |
| 3* | −153.438 | 5.00 | 1.85135 | 40.1 |
| 4* | −110.398 | 7.34 | | |
| 5* | 37.919 | 8.54 | 1.49710 | 81.6 |
| 6* | 903.753 | 7.42 | | |
| 7 (STO) | ∞ | 5.00 | | |
| 8* | −203.188 | 12.06 | 1.59201 | 67.0 |
| 9* | −32.219 | 0.70 | | |
| 10* | −115.357 | 2.40 | 2.00178 | 19.3 |
| 11* | −617.948 | 3.23 | | |
| 12* | −74.487 | −3.23 | | |
| 13* | −617.948 | 3.23 | | |
| 14* | −74.487 | 6.46 | 1.59201 | 67.0 |
| 15* | −31.878 | 0.70 | | |
| 16 | 70.760 | 5.61 | 1.49700 | 81.5 |
| 17 | ∞ | 5.00 | | |
| Image Plane | ∞ | | | |

ASPHERIC DATA

3rd Surface

K = 0.00000e+00 A 4 = 6.90310e−06 A 6 = −1.18669e−10 A 8 = −1.45462e−14

A10 = 1.85849e−15 A12 = −1.90182e−19

-continued

| UNIT: mm |
|---|
| 4th Surface |
| K = 0.00000e+00 A 4 = 1.07004e−05 A 6 = −5.16331e−09 A 8 = 9.53971e−12 |
| A10 = −6.99885e−15 A12 = 7.47937e−18 |
| 5th Surface |
| K = 0.00000e+00 A 4 = 6.23717e−06 A 6 = −1.03357e−08 A 8 = 6.34562e−12 |
| A10 = 3.18774e−14 A12 = −3.17854e−17 |
| 6th Surface |
| K = 0.00000e+00 A 4 = −8.13525e−07 A 6 = −5.00015e−09 A 8 = 1.68190e−11 |
| A10 = −1.88163e−14 A12 = 6.32007e−18 |
| 8th Surface |
| K = 0.00000e+00 A 4 = −1.43963e−05 A 6 = −3.55063e−09 A 8 = −5.68413e−11 |
| A10 = 1.68695e−13 A12 = −4.12289e−16 |
| 9th Surface |
| K = 0.00000e+00 A 4 = −1.55561e−06 A 6 = 1.09550e−08 A 8 = −1.24225e−10 |
| A10 = 2.97939e−13 A12 = −2.92015e−16 |
| 10th Surface |
| K = 0.00000e+00 A 4 = −1.22186e−05 A 6 = 5.22298e−09 A 8 = −1.27765e−10 |
| A10 = 1.32336e−13 A12 = −9.94539e−17 |
| 11th Surface |
| K = 0.00000e+00 A 4 = −1.06247e−05 A 6 = −4.24834e−09 A 8 = −1.49135e−11 |
| A10 = −3.70202e−14 A12 = 7.22317e−17 |
| 12th Surface |
| K = 0.00000e+00 A 4 = −6.52096e−06 A 6 = 2.60342e−09 A 8 = −4.67165e−11 |
| A10 = 6.11641e−14 A12 = −3.22546e−17 |
| 13th Surface |
| K = 0.00000e+00 A 4 = −1.06247e−05 A 6 = −4.24834e−09 A 8 = −1.49135e−11 |
| A10 = −3.70202e−14 A12 = 7.22317e−17 |
| 14th Surface |
| K = 0.00000e+00 A 4 = −6.52096e−06 A 6 = 2.60342e−09 A 8 = −4.67165e−11 |
| A10 = 6.11641e−14 A12 = −3.22546e−17 |
| 15th Surface |
| K = 0.00000e+00 A 4 = 3.96573e−07 A 6 = −1.25386e−08 A 8 = 7.36277e−12 |
| A10 = −4.81591e−15 A12 = −2.78757e−17 |

| VARIOUS DATA | |
|---|---|
| Focal Length | 24.00 |
| Fno | 0.70 |
| Half Angle of View [deg] | 42.04 |
| Overall Lens Length | 85.00 |
| BF | 5.00 |

| First Focus Lens Unit F1 | |
|---|---|
| Starting Surface | 8 |
| End Surface | 15 |

F1 drive amount during focusing at close distance (−0.6 m from image plane): −1.26

Numerical Example 2

| UNIT: mm | | | | |
|---|---|---|---|---|
| SURFACE DATA | | | | |
| Surface No. | r | d | nd | νd |
| 1 | 76.753 | 2.50 | 1.48749 | 70.2 |
| 2 | 20.301 | 6.55 | | |
| 3* | 70.537 | 4.46 | 1.53160 | 55.8 |
| 4* | 16.630 | 5.19 | | |
| 5 | 30.648 | 8.76 | 1.80810 | 22.8 |
| 6 | 38.051 | 1.78 | | |
| 7* | 23.414 | 3.26 | 1.53160 | 55.8 |
| 8* | 27.910 | 2.67 | | |
| 9 | 57.589 | 7.00 | 1.49700 | 81.5 |
| 10 | −76.924 | 2.61 | | |
| 11 (STO) | ∞ | 2.43 | | |
| 12 | 17.443 | 8.57 | 1.49700 | 81.5 |
| 13 | −35.398 | 0.50 | | |
| 14 | −43.619 | 1.50 | 1.85478 | 24.8 |
| 15 | ∞ | 1.52 | | |

-continued

| UNIT: mm | | | | |
|---|---|---|---|---|
| 16* | −103.975 | −1.52 | | |
| 17 | ∞ | 1.52 | | |
| 18* | −103.975 | 1.83 | 1.53160 | 55.8 |
| 19* | −33.803 | 0.70 | | |
| 20 | −2391.149 | 3.16 | 1.49700 | 81.5 |
| 21 | −37.807 | 11.50 | | |
| Image Plane | ∞ | | | |

ASPHERIC DATA

3rd Surface
K = 0.00000e+00 A 4 = 7.18789e−05 A 6 = −2.67733e−07 A 8 = 7.79197e−10
A10 = −1.30731e−12 A12 = 1.01400e−15
4th Surface
K = 0.00000e+00 A 4 = 5.88394e−05 A 6 = −1.66317e−07 A 8 = −1.61763e−09
A10 = 1.04955e−11 A12 = −3.01415e−14
7th Surface
K = 0.00000e+00 A 4 = −1.19790e−04 A 6 = −6.17280e−07 A 8 = 4.41932e−09
A10 = −3.35374e−11 A12 = 1.10260e−13
8th Surface
K = 0.00000e+00 A 4 = −1.24953e−04 A 6 = −3.77720e−07 A 8 = 3.14488e−09
A10 = −1.52028e−11 A12 = 5.44430e−14
16th Surface
K = 0.00000e+00 A 4 = 1.94438e−05 A 6 = 4.18663e−08 A 8 = −1.44043e−09
A10 = 9.06092e−12 A12 = −1.92562e−14
18th Surface
K = 0.00000e+00 A 4 = 1.94438e−05 A 6 = 4.18663e−08 A 8 = −1.44043e−09
A10 = 9.06092e−12 A12 = −1.92562e−14
19th Surface
K = 0.00000e+00 A 4 = 5.98622e−05 A 6 = −6.63837e−08 A 8 = 5.55235e−09
A10 = −3.24060e−11 A12 = 1.35603e−13

| VARIOUS DATA | |
|---|---|
| Focal Length | 12.06 |
| Fno | 1.00 |
| Half Angle of View[deg] | 50.23 |
| Overall Lens Length | 76.50 |
| BF | 11.50 |

| First Focus Lens Unit F1 | |
|---|---|
| Starting Surface | 12 |
| End Surface | 19 |

| Second Focus Lens Unit F2 | |
|---|---|
| Starting Surface | 9 |
| End Surface | 10 |

F1 drive amount during focusing at close distance (−0.2 m from image plane): −1.11

F2 drive amount during focusing at close distance (−0.2 m from image plane): 1.38

Numerical Example 3

UNIT: mm

SURFACE DATA

| Surface No. | r | d | nd | νd |
|---|---|---|---|---|
| 1* | −1292.458 | 3.50 | 1.48749 | 70.2 |
| 2 | 34.444 | 13.15 | | |
| 3 | 99.379 | 2.50 | 1.48749 | 70.2 |
| 4 | 22.729 | 11.66 | | |
| 5* | 35.646 | 2.00 | 1.59201 | 67.0 |
| 6* | 17.268 | 5.09 | | |
| 7 | 24.382 | 5.03 | 1.95375 | 32.3 |
| 8 | 63.807 | 12.36 | | |
| 9 (STO) | ∞ | 2.30 | | |
| 10 | 31.493 | 12.13 | 1.49700 | 81.5 |

-continued

| UNIT: mm | | | | |
|---|---|---|---|---|
| 11 | −15.201 | 1.20 | 1.80810 | 22.8 |
| 12 | −23.009 | 0.50 | | |
| 13 | −102.804 | 1.50 | 1.80810 | 22.8 |
| 14 | −39380.616 | 2.50 | | |
| 15* | −182.700 | −2.50 | | |
| 16 | −39380.616 | 2.50 | | |
| 17* | −182.700 | 4.00 | 1.59201 | 67.0 |
| 18* | −61.894 | 0.70 | | |
| 19* | −152.590 | 6.30 | 1.59201 | 67.0 |
| 20* | −21.028 | 13.60 | | |
| Image Plane | ∞ | | | |

ASPHERIC DATA

1st Surface
K = 0.00000e+00 A 4 = 6.35973e−06 A 6 = −4.69667e−09 A 8 = 2.56033e−12
A10 = −7.77952e−16 A12 = 1.12638e−19
5th Surface
K = 0.00000e+00 A 4 = 8.12933e−05 A 6 = −2.98011e−07 A 8 = 7.85905e−10
A10 = −2.20542e−12 A12 = 2.68019e−15
6th Surface
K = 0.00000e+00 A 4 = 8.52668e−05 A 6 = −2.16917e−07 A 8 = −1.25803e−10
A10 = −2.48945e−12 A12 = 4.79686e−15
15th Surface
K = 0.00000e+00 A 4 = 7.55612e−06 A 6 = 5.10821e−08 A 8 = −3.59935e−10
A10 = 1.35344e−12 A12 = −2.35031e−15
17th Surface
K = 0.00000e+00 A 4 = 7.55612e−06 A 6 = 5.10821e−08 A 8 = −3.59935e−10
A10 = 1.35344e−12 A12 = −2.35031e−15
18th Surface
K = 0.00000e+00 A 4 = 8.49549e−06 A 6 = 7.19326e−08 A 8 = −8.15232e−10
A10 = 2.85603e−12 A12 = −3.66330e−15
19th Surface
K = 0.00000e+00 A 4 = −5.26526e−05 A 6 = 4.46114e−07 A 8 = −1.98536e−09
A10 = 4.22671e−12 A12 = −3.60703e−15
20th Surface
K = 0.00000e+00 A 4 = −1.24404e−05 A 6 = 3.08673e−07 A 8 = −9.40054e−10
A10 = 1.39679e−12 A12 = −4.24441e−16

| VARIOUS DATA | |
|---|---|
| Focal Length | 11.00 |
| Fno | 2.03 |
| Half Angle of View [deg] | 63.04 |
| Overall Lens Length | 100.00 |
| BF | 13.60 |

| First Focus Lens Unit F1 | |
|---|---|
| Starting Surface | 10 |
| End Surface | 18 |

| Second Focus Lens Unit F2 | |
|---|---|
| Starting Surface | 7 |
| End Surface | 8 |

F1 drive amount during focusing at close distance (−0.4 m from image plane): −1.12
F2 drive amount during focusing at close distance (−0.4 m from image plane): −0.20

Numerical Example 4

| UNIT: mm | | | | |
|---|---|---|---|---|
| SURFACE DATA | | | | |
| Surface No. | r | d | nd | νd |
| 1 | 50.186 | 2.20 | 1.72916 | 54.7 |
| 2 | 13.491 | 5.81 | | |

-continued

| UNIT: mm | | | | |
|---|---|---|---|---|
| 3 | 23.081 | 1.50 | 1.72916 | 54.7 |
| 4 | 8.511 | 6.82 | | |
| 5* | −22.785 | 1.52 | 1.53160 | 55.8 |
| 6* | 17.057 | 0.52 | | |
| 7 | 17.659 | 3.21 | 1.80810 | 22.8 |
| 8 | −36.916 | 4.94 | | |
| 9 (STO) | ∞ | 1.64 | | |
| 10 | 13.259 | 3.16 | 1.49700 | 81.5 |
| 11 | −17.587 | 0.82 | | |
| 12 | −17.100 | 1.05 | 1.92286 | 18.9 |
| 13 | ∞ | 1.10 | | |
| 14* | −296.941 | −1.10 | | |
| 15 | ∞ | 1.10 | | |
| 16* | −296.941 | 1.41 | 1.59201 | 67.0 |
| 17* | −74.408 | 0.70 | | |
| 18 | 61.343 | 5.78 | 1.49700 | 81.5 |
| 19 | −12.256 | 0.60 | | |
| 20 | 57.193 | 2.20 | 1.49700 | 81.5 |
| 21 | −219.428 | 13.60 | | |
| Image Plane | ∞ | | | |

ASPHERIC DATA

5th Surface
K = 0.00000e+00 A 4 = 9.41582e−05 A 6 = 1.58368e−06 A 8 = −1.22848e−07
A10 = 2.37154e−09 A12 = −1.69053e−11
6th Surface
K = 0.00000e+00 A 4 = 1.88314e−06 A 6 = 4.96667e−06 A 8 = −3.28152e−07
A10 = 7.32711e−09 A12 = −6.13397e−11
14th Surface
K = 0.00000e+00 A 4 = 2.42656e−05 A 6 = 2.89608e−07 A 8 = 8.23640e−09
A10 = −1.25973e−09 A12 = 2.83740e−11
16th Surface
K = 0.00000e+00 A 4 = 2.42656e−05 A 6 = 2.89608e−07 A 8 = 8.23640e−09
A10 = −1.25973e−09 A12 = 2.83740e−11
17th Surface
K = 0.00000e+00 A 4 = 1.86570e−04 A 6 = 7.03375e−07 A 8 = −3.75096e−09
A10 = −4.21870e−10 A12 = 9.23085e−12

| VARIOUS DATA | |
|---|---|
| Focal Length | 6.21 |
| Fno | 2.00 |
| Half Angle of View[deg] | 105.0 |
| Overall Lens Length | 58.60 |
| BF | 13.60 |

TABLE 1 summarizes various values in each numerical example.

TABLE 1

| | Inequality | | | | | | | | |
|---|---|---|---|---|---|---|---|---|---|
| | (1) | (2) | (3) | (4) | (5) | (6) | (7) | (8) | (9) |
| Ex. 1 | 0.875 | 1.72 | 1.83 | 0.0380 | 0.741 | 0.237 | 0.275 | 3.54 | 0.700 |
| Ex. 2 | 1.551 | 2.63 | 3.71 | 0.0199 | 1.426 | 0.170 | 0.190 | 6.34 | 1.000 |
| Ex. 3 | 2.462 | 4.06 | 5.02 | 0.0250 | 2.235 | 0.176 | 0.201 | 9.09 | 2.030 |
| Ex. 4 | 4.090 | 5.16 | 4.27 | 0.0188 | 3.913 | 0.114 | 0.132 | 9.44 | 2.000 |

Image Pickup Apparatus

Figure 14:
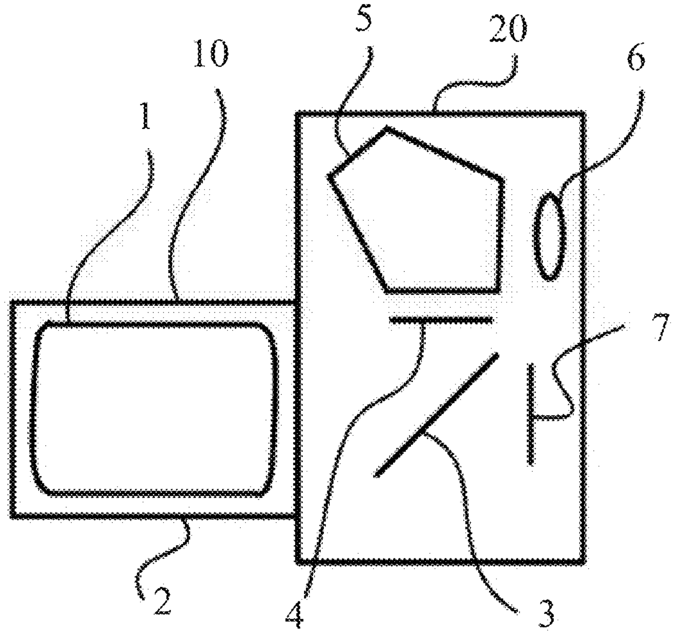
FIG. 14 is a schematic diagram of an image pickup apparatus.

Referring now to FIG. 14, a description will be given of an image pickup apparatus having an imaging optical system according to any one of the above examples. FIG. 14 is a schematic diagram of a single-lens reflex camera as an example of an image pickup apparatus. The lens apparatus 10 includes an imaging lens 1 as one of the imaging optical systems according to any one of Examples 1 to 4, and a lens barrel 2 configured to hold the imaging lens 1. The camera body 20 has a quick return mirror 3 configured to reflect a light beam from the lens apparatus 10 upward, a focus screen 4 disposed at an imaging position of the lens apparatus 10, and a penta dach prism 5 that converts an inverse image formed on the focus screen 4 into an erect image. The camera body 20 further includes an eyepiece lens 6 configured to enable a user to observe the erect image.

An image sensor (photoelectric conversion element) such as a CCD sensor or a CMOS sensor is disposed on an imaging surface 7. During imaging, the quick return mirror 3 is removed from the optical path, and an image is formed on the imaging surface 7 by the lens apparatus 10. The image sensor receives the optical image formed through the imaging lens 1, photoelectrically converts it, and outputs image data. The imaging lens 1 can also be applied to an image pickup apparatus that does not have a quick return mirror 3.

Thus, applying the imaging optical system according to each example to an image pickup apparatus such as a video camera or digital still camera can realize an image pickup apparatus with high optical performance.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide a compact imaging optical system with a wide angle and a bright F-number.

This application claims priority to Japanese Patent Application No. 2023-147317, which was filed on Sep. 12, 2023, and which is hereby incorporated by reference herein in its entirety.

What is claimed is:

1. An imaging optical system comprising, in order from an object side to an image side:

at least one negative lens;

an aperture stop;

a first transmissive reflective surface;

a quarter waveplate; and a second transmissive reflective surface, arranged such that light from the object side transmits through the first transmissive reflective surface and the quarter waveplate in this order, is reflected by the second transmissive reflective surface toward the object side, transmits through the quarter waveplate, is reflected by the first transmissive reflective surface toward the image side, transmits through the quarter waveplate and the second transmissive reflective surface in this order, and travels toward the image side, wherein the following inequality is satisfied:

$$0.55 \leq zm1/f \leq 4.80$$

where zm1 is a distance on an optical axis from the first transmissive reflective surface to an image plane, and f is a focal length of the imaging optical system.

2. The imaging optical system according to claim 1, wherein the following inequality is satisfied:

$$1.2 \leq zp/f \leq 6.5$$

where zp is a distance on the optical axis from the aperture stop to the image plane.

3. The imaging optical system according to claim 1, wherein the following inequality is satisfied:

$$1.0 \leq Dp/f \leq 6.5$$

where Dp is a distance on the optical axis from a lens surface closest to an object of the imaging optical system to the aperture stop.

4. The imaging optical system according to claim 1, wherein the following inequality is satisfied:

$$0.005 \leq Dm/L \leq 0.060$$

where L is an overall length of the imaging optical system, and Dm is a distance on the optical axis from the first transmissive reflective surface to the second transmissive reflective surface.

5. The imaging optical system according to claim 1, wherein the following inequality is satisfied:

$$0.50 \leq zm2/f \leq 4.50$$

where zm2 is a distance on the optical axis from the second transmissive reflective surface to the image plane.

6. The imaging optical system according to claim 1, wherein the following inequality is satisfied:

$$0.07 \leq Dm1/L \leq 0.40$$

where L is an overall length of the imaging optical system, and Dm1 is a distance on the optical axis from the aperture stop to the first transmissive reflective surface.

7. The imaging optical system according to claim 1, wherein the following inequality is satisfied:

$$0.09 \leq Dm2/L \leq 0.42$$

where L is an overall length of the imaging optical system, and Dm2 is a distance on the optical axis from the aperture stop to the second transmissive reflective surface.

8. The imaging optical system according to claim 1, wherein the following inequality is satisfied:

$$2.5 \leq L/f \leq 11.5$$

where L is an overall length of the imaging optical system.

9. The imaging optical system according to claim 1, wherein the following inequality is satisfied:

$$0.55 \leq Fno \leq 2.50$$

where Fno is an F-number of the imaging optical system.

10. The imaging optical system according to claim 1, wherein the second transmissive reflective surface has a concave shape on the object side.

11. An imaging optical system comprising, in order from an object side to an image side:

an aperture stop;

a first transmissive reflective surface;

a quarter waveplate; and a second transmissive reflective surface, arranged such that light from the object side transmits through the first transmissive reflective surface and the quarter waveplate in this order, is reflected by the second transmissive reflective surface toward the object side, transmits through the quarter waveplate, is reflected by the first transmissive reflective surface toward the image side, transmits through the quarter waveplate and the second transmissive reflective surface in this order, and travels toward the image side, wherein the following inequality is satisfied:

$$0.80 \leq zm1/f \leq 4.80$$

where zm1 is a distance on an optical axis from the first transmissive reflective surface to the image plane, and f is a focal length of the imaging optical system.

12. The imaging optical system according to claim 11, wherein the following inequality is satisfied:

$$1.2 \leq zp/f \leq 6.5$$

where zp is a distance on the optical axis from the aperture stop to the image plane.

13. The imaging optical system according to claim 11, wherein the following inequality is satisfied:

$$1.0 \leq Dp/f \leq 6.5$$

where Dp is a distance on the optical axis from a lens surface closest to an object of the imaging optical system to the aperture stop.

14. The imaging optical system according to claim 11, wherein the following inequality is satisfied:

$$0.005 \leq Dm/L \leq 0.060$$

where L is an overall length of the imaging optical system, and Dm is a distance on the optical axis from the first transmissive reflective surface to the second transmissive reflective surface.

15. The imaging optical system according to claim 11, wherein the following inequality is satisfied:

$$0.50 \leq zm2/f \leq 4.50$$

where zm2 is a distance on the optical axis from the second transmissive reflective surface to the image plane.

16. The imaging optical system according to claim 11, wherein the following inequality is satisfied:

$$0.07 \leq Dm1/L \leq 0.40$$

where L is an overall length of the imaging optical system, and Dm1 is a distance on the optical axis from the aperture stop to the first transmissive reflective surface.

17. The imaging optical system according to claim 11, wherein the following inequality is satisfied:

$$0.09 \leq Dm2/L \leq 0.42$$

where L is an overall length of the imaging optical system, and Dm2 is a distance on the optical axis from the aperture stop to the second transmissive reflective surface.

18. The imaging optical system according to claim 11, wherein the following inequality is satisfied:

$$2.5 \leq L/f \leq 11.5$$

where L is an overall length of the imaging optical system.

19. An image pickup apparatus comprising:

an imaging optical system; and an image sensor configured to receive an image formed by the imaging optical system, wherein the imaging optical system includes, in order from an object side to an image side:

at least one negative lens;

an aperture stop;

a first transmissive reflective surface;

a quarter waveplate; and a second transmissive reflective surface, arranged such that light from the object side transmits through the first transmissive reflective surface and the quarter waveplate in this order, is reflected by the second transmissive reflective surface toward the object side, transmits through the quarter waveplate, is reflected by the first transmissive reflective surface toward the image side, transmits through the quarter waveplate and the second transmissive reflective surface in this order, and travels toward the image side, and wherein the following inequality is satisfied:

$$0.55 \leq zm1/f \leq 4.80$$

where zm1 is a distance on an optical axis from the first transmissive reflective surface to an image plane, and f is a focal length of the imaging optical system.

20. An image pickup apparatus comprising:

an imaging optical system; and an image sensor configured to receive an image formed by the imaging optical system, wherein the imaging optical system includes, in order from an object side to an image side:

an aperture stop;

a first transmissive reflective surface;

a quarter waveplate; and a second transmissive reflective surface, arranged such that light from the object side transmits through the first transmissive reflective surface and the quarter waveplate in this order, is reflected by the second transmissive reflective surface toward the object side, transmits through the quarter waveplate, is reflected by the first transmissive reflective surface toward the image side, transmits through the quarter waveplate and the second transmissive reflective surface in this order, and travels toward the image side, and wherein the following inequality is satisfied:

$$0.80 \leq zm1/f \leq 4.80$$

where zm1 is a distance on an optical axis from the first transmissive reflective surface to the image plane, and f is a focal length of the imaging optical system.

* * * * *